(12) United States Patent
Evangelisti et al.

(10) Patent No.: US 10,377,839 B2
(45) Date of Patent: Aug. 13, 2019

(54) MAGNESIUM DICHLORIDE-ALCOHOL ADDUCTS AND CATALYST COMPONENTS OBTAINED THEREFROM

(71) Applicant: Basell Poliolefine Italia S.r.l., Milan (IT)

(72) Inventors: Daniele Evangelisti, Ferrara (IT); Fabiana Fantinel, Ferrara (IT); Benedetta Gaddi, Ferrara (IT); Diego Brita, Ferrara (IT); Gianni Collina, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 365 days.

(21) Appl. No.: 14/419,446

(22) PCT Filed: Aug. 1, 2013

(86) PCT No.: PCT/EP2013/066148
§ 371 (c)(1),
(2) Date: Feb. 3, 2015

(87) PCT Pub. No.: WO2014/020093
PCT Pub. Date: Feb. 6, 2014

(65) Prior Publication Data
US 2015/0225494 A1 Aug. 13, 2015

Related U.S. Application Data

(60) Provisional application No. 61/679,446, filed on Aug. 3, 2012.

(30) Foreign Application Priority Data
Aug. 3, 2012 (EP) .................................. 12179217

(51) Int. Cl.
*B01J 31/38* (2006.01)
*C08F 10/00* (2006.01)
*C08F 110/02* (2006.01)

(52) U.S. Cl.
CPC ............ *C08F 110/02* (2013.01); *C08F 10/00* (2013.01); *B01J 31/38* (2013.01)

(58) Field of Classification Search
CPC .................................. C08F 4/654; B01J 31/38
USPC .................................................. 502/111, 172
See application file for complete search history.

(56) References Cited

U.S. PATENT DOCUMENTS

| | | | |
|---|---|---|---|
| 6,127,304 A | 10/2000 | Sacchetti et al. | |
| 6,407,028 B1 | 6/2002 | Sacchetti et al. | |
| 6,437,061 B1 | 8/2002 | Sacchetti et al. | |
| 7,087,688 B2 * | 8/2006 | Evangelisti | C01F 5/30 502/103 |
| 7,439,313 B2 * | 10/2008 | Evangelisti | C01F 5/30 502/103 |
| 9,587,040 B2 * | 3/2017 | Gaddi | C08F 10/00 |
| 9,862,781 B2 * | 1/2018 | Evangelisti | C08F 10/00 |
| 2006/0025300 A1 | 2/2006 | Diego et al. | |
| 2006/0217261 A1 | 9/2006 | Morini et al. | |
| 2012/0283402 A1 * | 11/2012 | Evangelisti | C01F 5/30 526/187 |

FOREIGN PATENT DOCUMENTS

| | | | |
|---|---|---|---|
| CN | 1226901 A | 8/1999 | |
| CN | 1726080 A | 1/2006 | |
| EP | 395083 A2 | 10/1990 | |
| WO | WO-03082930 A2 | 10/2003 | |
| WO | WO-2004026920 A1 | 4/2004 | |
| WO | WO-2011076669 A2 | 6/2011 | |
| WO | WO 2012084735 A1 * | 6/2012 | ............. C08F 10/00 |
| WO | WO-2012084735 A1 | 6/2012 | |

* cited by examiner

*Primary Examiner* — Rip A Lee

(57) ABSTRACT

Solid adducts comprising $MgCl_2$, ethanol and water characterized in that the amount of ethanol ranges from 50% to less than 57% by weight, the amount of water is ranges from 0.5 to 5% by weight, the ethanol/water weight ratio is lower than 60 and the porosity determined with Hg method due to pores with radius up to 1 μm and expressed in $cm^3/g$, is lower than 0.2.

5 Claims, No Drawings

MAGNESIUM DICHLORIDE-ALCOHOL ADDUCTS AND CATALYST COMPONENTS OBTAINED THEREFROM

FIELD OF INVENTION

The present invention relates to magnesium dichloride/ethanol adducts which are characterized by particular chemical and physical properties. The adducts of the present invention are particularly useful as precursors of catalyst components for the polymerization of olefins.

BACKGROUND OF INVENTION $MgCl_2$·alcohol adducts and their use in the preparation of catalyst components for the polymerization of olefins are well known in the art.

Catalyst components for the polymerization of olefins, obtained by reacting $MgCl_2$·nEtOH adducts with halogenated transition metal compounds, are known in the art and described for example in U.S. Pat. Nos. 4,399,054 and 6,127,304. The adducts are prepared by emulsifying the molten adduct in an immiscible dispersing medium and quenching the emulsion in a cooling fluid to collect the adduct in the form of spherical particles. The adduct generated by this process has generally a number of moles of alcohol per mole of $MgCl_2$ of about three. The catalysts obtained by the said adducts in general display a high activity but in some cases are to be improved in terms of morphological stability. According to the teaching of the art, the morphological stability can be increased by dealcoholating to some extent the adduct so as to induce the formation of porosity. The so obtained adduct indeed produces a catalyst that may be more stable but often also less active in polymerization.

In order to create a right mix of properties WO2012/084735 teaches to prepare magnesium chloride ethanol adducts originally having 4 moles of alcohol per mole of magnesium and also containing a relatively high amount of water. The adducts are then dealcoholated to create adducts with pores having radius in a specific range size. The deriving catalyst shows indeed capability to produce polymer particles with a reduced percentage of breakages in propylene polymerization but with a bulk density still to be improved for reaching a satisfactory plant productivity. On the other hand, EP 1490416 B1 expressly teaches not to exceed 1% of water in the ethanol/magnesium chloride adduct preparation in order to have high activity. This is proved by the fact that when the amount of water is increased (comparative example 1), the polymerization activity decreased. The applicant also proved that the adducts having a limited amount of water and and least 57% bw of ethanol as taught by the cited reference do not generate catalysts with a satisfactory stability in ethylene polymerization.

It has therefore been very surprising to discover that adducts having reduced porosity and relatively low ethanol/water ratio could generate catalysts which in turn produce polymers having very high bulk density, good balance between activity and stereo specificity and high stability in ethylene polymerization.

SUMMARY OF THE INVENTION

The present invention therefore relates to adducts comprising $MgCl_2$, ethanol and water characterized in that the amount of ethanol ranges from 50% to less than 57% by weight, the amount of water ranges from 0.5 to 5% by weight, the ethanol/water weight ratio is lower than 60 and the porosity determined with Hg method due to pores with radius up to 1 µm and expressed in $cm^3/g$, is lower than 0.2.

DETAILED DESCRIPTION

Preferably the adducts of the invention have a percentage of alcohol ranging from 52 to 55% bw, more preferably from 53 to 55%. The amount of water is preferably higher than 1%, more preferably higher than 1.4 and especially ranging from 1.5 to 3% bw. The ethanol/water weight ratio is preferably lower than 50, more preferably lower than 42 and especially lower than 30. The porosity is preferably lower than 0.15 $cm^3/g$, and especially lower than 0.1 $cm^3/g$.

The adducts of the invention may also be additionally characterized by a DSC diagram (profile) in which the main peak has a melting temperature at about 97° C. ±1 while the highest melting Temperature (Tm) peak is always below 108° C. The total fusion enthalpy (ΔH) ranges from 100 to 110 J/g. The DSC analysis is carried out using the apparatus and the methodology described hereinafter.

The adducts of the present invention can be prepared according to several methods. In particular the general methods described in WO98/44009 are suitable with the proviso that the amounts of ethanol and water are carefully controlled and set to be within the described limits.

According to one of these methods the adducts are prepared by dispersing the particles of magnesium dichloride in an inert liquid immiscible with and chemically inert to the molten adduct, heating the system at temperature equal to or higher than the melting temperature of $MgCl_2$·ethanol adduct and then adding the desired amount of alcohol in vapour phase also containing the proper amount of water in it. The temperature is kept at values such that the adduct is completely melted.

The molten adduct is then emulsified in a liquid medium which is immiscible with and chemically inert to it and then quenched by contacting the adduct with an inert cooling liquid, thereby obtaining the solidification of the adduct. The liquid in which the $MgCl_2$ is dispersed can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred. After the $MgCl_2$ particles are dispersed in the inert liquid, the mixture is heated at temperatures preferably higher than 125° C. and more preferably at temperatures higher than 150° C. Conveniently, the vaporized alcohol is added at a temperature equal to or lower than the temperature of the mixture.

According to another method, the adducts of the invention are prepared by contacting $MgCl_2$ and alcohol and water in the absence of the inert liquid dispersant, heating the system at the melting temperature of $MgCl_2$-alcohol adduct or above, and maintaining said conditions so as to obtain a completely melted adduct. Said molten adduct is then emulsified in a liquid medium which is immiscible with and chemically inert to it and finally quenched by contacting the adduct with an inert cooling liquid thereby obtaining the solidification of the adduct. In particular, the adduct is preferably kept at a temperature equal to or higher than its melting temperature, under stirring conditions, for a time period equal to or greater than 10 hours, preferably from 10 to 150 hours, more preferably from 20 to 100 hours. Alternatively, in order to obtain the solidification of the adduct, a spray-cooling process of the molten adduct can be carried out. All these methods provide solid adducts having a spherical morphology which are very suitable in the preparation of spherical catalyst components for the polymerization of olefins and in particular for the gas-phase polymerization process.

The method of the present invention provides solid adducts having a substantially spherical morphology which are particularly suitable in the preparation of spherical catalyst components for the polymerization of olefins and in particular for the gas-phase polymerization process. With the term substantially spherical morphology are meant those particles having a ratio between the greater and smaller axis equal to or lower than 1.5 and preferably lower than 1.3.

Upon reaction with transition metal compounds, the adducts of the invention form suitable catalyst components for the polymerization of olefins.

The adducts can be reacted as such with the transition metal compound or, in alternative, they can be subject to a preliminary step of dealcoholation. Particularly for the preparation of ethylene polymerization catalysts the dealcoholation step is preferred.

Among transition metal compounds particularly preferred are titanium compounds of formula $Ti(OR)_nX_{y-n}$ in which n is comprised between 0 and y; y is the valence of titanium; X is halogen and R is an hydrocarbon radical, preferably alkyl, radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably, the reaction is carried out by suspending the adduct in cold $TiCl_4$ (generally 0° C.); then the so obtained mixture is heated up to 80-135° C. and kept at this temperature for 0.5-2 hours. After that the excess of $TiCl_4$ is removed and the solid component is recovered. The treatment with $TiCl_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones or mixtures thereof In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexylsuccinate, ethyl-benzoate and p-ethoxy ethyl-benzoate. Also, the esters disclosed in WO2010/078494 and U.S. Pat. No. 7,388,061 can be used. Among this class, particularly preferred are the 2,4-pentanediol dibenzoate derivatives. Moreover, can be advantageously used also the 1,3 diethers of the formula (I):

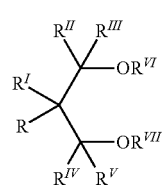

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of $R—R^V$ except that they cannot be hydrogen; one or more of the $R—R^{VII}$ groups can be linked to form a cycle. The 1,3-diethers in which $R^{VI}$ and $R^{VII}$ are selected from $C_1$-$C_4$ alkyl radicals are particularly preferred.

The use of mixtures of succinates, such as diethyl 2,2-diisopropylsuccinate and 1,3-diethers belonging to formula (I) is preferred.

The electron donor compound is generally present in molar ratio with respect to the magnesium comprised between 1:4 and 1:60.

Preferably, the particles of the solid catalyst components have substantially the same size and morphology as the adducts of the invention generally comprised between 5 and 150 μm.

As explained, before the reaction with the transition metal compound, the adducts of the present invention can also be subjected to a dealcoholation treatment aimed at lowering the alcohol content and increasing the porosity of the adduct itself The dealcoholation can be carried out according to known methodologies such as those described in EP-A-395083. Depending on the extent of the dealcoholation treatment, partially dealcoholated adducts can be obtained having a residual alcohol content ranging from 1 to 40% and preferably ranging from 5 to 30% moles of ethanol per mole of $MgCl_2$. After the dealcoholation treatment the adducts are reacted with the transition metal compound, according to the techniques described above, in order to obtain the solid catalyst components. Such a treatment is preferably carried out when it is necessary to prepare a catalyst for ethylene polymerization or a catalyst for the preparation of heterophasic copolymers containing a substantial amount of rubbery copolymer.

The solid catalyst components according to the present invention show a surface area (by B.E.T. method) generally between 10 and 500 $m^2$/g and preferably between 20 and 350 $m^2$/g, and a total porosity (by B.E.T. method) higher than 0.15 cm3/g preferably between 0.2 and 0.6 $cm^3$/g.

The amount of the titanium compound in the final catalyst component ranges from 0.1 to 10% wt, preferably from 0.5 to 5% wt.

The catalyst components of the invention form catalysts for the polymerization of alpha-olefins $CH2=CHR$, wherein R is hydrogen or a hydrocarbon radical having 1-12 carbon atoms, by reaction with Al-alkyl compounds. The alkyl-Al compound can be of the formula $AlR_{3-z}X_z$ above, in which R is a $C_1$-$C_{15}$ hydrocarbon alkyl radical, X is halogen preferably chlorine and z is a number 0≤z<3. The Al-alkyl compound is preferably chosen among the trialkyl aluminum compounds such as for example trimethylaluminum, triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 50 and 2000.

It is possible to use in the polymerization system an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, diisopropyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the cyclic ethers such as tetrahydrofurane, and the 1,3 diethers having the previously described formula can be used as external donor.

As previously indicated the components of the invention and catalysts obtained therefrom find applications in the processes for the (co)polymerization of olefins of formula CH2=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

In particular, it has been noticed that the catalyst components obtained from the said adducts generate during polymerization polymer particles of smaller diameter which makes slurry process easier to be controlled.

The following examples are given to further illustrate without limiting in any way the invention itself Characterization Porosity and Surface Area with Mercury:

The measure is carried out using a "Porosimeter 2000 series" by Carlo Erba.

The porosity is determined by absorption of mercury under pressure. For this determination use is made of a calibrated dilatometer (diameter 3 mm) CD3 (Carlo Erba) connected to a reservoir of mercury and to a high-vacuum pump (1•10-2 mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), due to pores with radius up to 1 μm for catalysts (10 μm for polymers), the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

DSC Measurements

The DSC measurement were carried out with a METTLER DSC 30 instrument at a scanning rate of 5° C./min in the range 5-125° C. Aluminum capsules having a volume of 40 μl filled with the samples in a dry-box were used in order to avoid hydration of the samples.

EXAMPLES

General Procedure for the Preparation of the Catalyst Component for Propylene Polymerization Into a 1l steel reactor provided with stirrer, 800 cm³ of TiCl$_4$ at 0° C. were introduced; at room temperature and whilst stirring 24 g of the adduct were introduced together with an amount of diisobutylphthalate as internal donor so as to give a donor/Mg molar ratio of 8. The whole was heated to 100° C. over 90 minutes and these conditions were maintained over 60 minutes. The stirring was stopped and after 30 minutes the liquid phase was separated from the sedimented solid maintaining the temperature at 100° C. A further treatment of the solid was carried out adding 750 cm3 of TiCl$_4$ and heating the mixture at 110° C. over 10 min. and maintaining said conditions for 30 min under stirring conditions (500 rpm). The stirring was then discontinued and after 30 minutes the liquid phase was separated from the sedimented solid maintaining the temperature at 110° C. A further treatment of the solid was carried out adding 750 cm³ of TiCl$_4$ and heating the mixture at 120° C. over 10 min. and maintaining said conditions for 30 min under stirring conditions (500 rpm). The stirring was then discontinued and after 30 minutes the liquid phase was separated from the sedimented solid maintaining the temperature at 120° C. A further treatment of the solid was carried out adding 750 cm³ of TiCl$_4$ and heating the mixture at 120° C. over 10 min. and maintaining said conditions for 30 min under stirring conditions (500 rpm). The stirring was then discontinued and after 30 minutes the liquid phase was separated from the sedimented solid maintaining the temperature at 120° C. Thereafter, 3 washings with 500 cm³ of anhydrous hexane at 60° C. and 3 washings with 500 cm³ of anhydrous hexane at room temperature were carried out. The solid catalyst component obtained was then dried under vacuum in nitrogen environment at a temperature ranging from 40-45° C. General procedure for the preparation of the catalyst component for ethylene polymerization Into a 2L four-necked round flask, purged with nitrogen, 1 L of $TiCl_4$ was introduced at 0° C. Then, at the same temperature, 70 g of a spherical $MgCl_2$/EtOH adduct obtained by dealcoholating the adduct of the invention up to 23% wt of ethanol, were added under stirring. The temperature was raised to 130° C. in 1 h and maintained for 60 min. Then, the stirring was discontinued, the solid product was allowed to settle (at the same temperature) and then, the supernatant liquid was siphoned off. A new volume of fresh $TiCl_4$ was added into the glass reactor in order to have the same solid concentration as in the first treatment. The temperature was then raised to 110° C. and maintained for 15'. After the stop of stirring and the solid settling (at the same temperature), the product was washed 5 times with anhydrous hexane (5×1L) at 50 ° C. and two times at room temperature. Then, a volume of anhydrous hexane was added into the reactor in order to have (once more) 1 L of total liquid. Under stirring, the temperature was raised to 50° C. and an amount of ethyl acetate corresponding to a molar ratio Mg/Acetate of 1.5 was added drop-wise. The temperature was kept at 50° C. and the mixture was stirred for 2 hours. Then, the stirring was discontinued, the solid product was allowed to settle and the supernatant liquid was siphoned off. The solid was washed 2 times with anhydrous hexane (2×1 L) at 25° C., recovered, dried under vacuum and analyzed.

Fraction soluble in xylene. (XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams. The xylene insoluble fraction is given by the expression 100-XS.

General Procedure for the Propylene Polymerization Test

A 4 liter steel autoclave equipped with a stirrer, pressure gauge, thermometer, catalyst feeding system, monomer feeding lines and thermostatting jacket, was used. The reactor was charged with 0.01 gr. of solid catalyst component 0.76 g of TEAL, 0.076 g of cyclohexylmethyldimetoxy silane, 3.2 l of propylene, and 2.0 l of hydrogen. The system was heated to 70° C. over 10 min. under stirring, and maintained under these conditions for 120 min. At the end of the polymerization, the polymer was recovered by removing any unreacted monomers and was dried under vacuum.

General Procedure for Ethylene Polymerization Test.

A 4.5 liter stainless-steel autoclave equipped with a magnetic stirrer, temperature and pressure indicator, feeding line for hexane, ethylene, and hydrogen, was used and purified by fluxing pure nitrogen at 70° C. for 60 minutes. Then, a solution of 1550 cm3 of hexane containing 4 cm3 of 10% by wt/vol TEAL/hexane was introduced at a temperature of 30° C. under nitrogen flow. In a separate 200 cm3 round bottom glass bottle were successively introduced, 50 cm3 of anhydrous hexane, 1 cm3 of 10% by wt/vol, TEAL/hexane solution and 0.020+0.025 g of the solid catalyst of table 1. They were mixed together, aged 10 minutes at room temperature and introduced under nitrogen flow into the reactor. The autoclave was closed, then the temperature was raised to 75° C., hydrogen (4 bars partial pressure) and ethylene (7.0 bars partial pressure) were added. Under continuous stirring, the total pressure was maintained at 75° C. for 120 minutes by feeding ethylene. At the end the reactor was depressurised and the temperature was dropped to 30° C. The recovered polymer was dried at 70° C. under a nitrogen flow and analyzed. The obtained results are reported in table 2.

Example 1

In a reactor containing 51.2 kg of anhydrous EtOH and 1.1 kg of water at room temperature were introduced under stirring 39.9 kg of $MgCl_2$. Once the addition of $MgCl_2$ was completed, the temperature was raised up to 125° C. and kept at this value for 12 hours. After that, the melt was continuously fed to a stirred emulsification unit and mixed with OB55 vaseline oil, while stirring was brought to 1100 rpm and keeping the temperature at 128° C. The mixture was discharged into a vessel containing hexane which was kept under stirring and cooled at the temperature of 10° C. After 12 hours, the solid particles of the $MgCl_2$•EtOH adduct recovered were then washed with hexane and dried at 40° C. flash dryer. The compositional analysis showed that the support contained 54.4% by weight of EtOH and 1.35% of water (EtOH/water weight ratio 40). The porosity of said adduct was 0.075 cm³/g. The DSC profile showed the main peak at 98.1° C. with total associated fusion enthalpy of 97.1 J/g.

Example 2

In a vessel reactor containing 838 g of anhydrous EtOH containing 15 g of water at room temperature were introduced under stirring 673 g of $MgCl_2$. Once the addition of $MgCl_2$ was completed, the temperature was raised up to 125° C. and kept at this value for 7 hours. After that, the melt was continuously fed to a stirred emulsification unit, mixed with 5600 cm³ OB55 vaseline oil, while the stirring was brought to 2800 rpm and kept at that value for ten minutes, keeping the temperature at 130° C. Subsequently, the mixture was discharged into a vessel containing hexane which was kept under stirring and cooled so that the final temperature did not exceed 2° C. After 12 hours, the solid particles of the $MgCl_2$•EtOH adduct recovered were then washed with hexane and dried at 40° C. under vacuum. The compositional analysis showed that they contained 53% by weight of EtOH and 1.65% of water (EtOH/water weight ratio 32). The porosity of said adduct was 0.088 cm³/g. The DSC profile showed the main peak at 97.85° C. and the highest temperature peak at 103.6° C. with total associated fusion enthalpy of 109.1 J/g. The support was then dealcoholated in a fluidised bed obtaining a dealcoholated support having 22.8% ethanol and 2.5% of water. A catalyst for ethylene polymerization was prepared and tested according to the general methods and the results are reported in table 2.

Example 3

An adduct was prepared according to the procedure of Example 2 with the difference that 15 g of additional water were introduced. The compositional analysis showed that the adduct contained 52% by weight of EtOH and 2.6% of water (EtOH/water weight ratio 20). The porosity of said adduct was 0.082 cm³/g. The DSC profile showed the main peak at 97.5° C. with total associated fusion enthalpy of 103.2 J/g. The support was then dealcoholated in a fluidised bed obtaining a dealcoholated support having 21% ethanol and 4.3% of water. The catalyst component for ethylene polymerization was prepared and tested according to the general methods and the results are reported in table 2.

Comparison Example 1

The procedure of Example 2 was repeated with the difference that 886 g of anhydrous EtOH at room temperature were used, while 633 g of MgCl2 were introduced under stirring. The compositional analysis showed that the adduct contained 58.2% by weight of EtOH and 0.6% of water (EtOH/water ratio 97). The support was then dealcoholated in a fluidised bed obtaining a dealcoholated support having 22.3% ethanol and 0.8% of water. The catalyst component for ethylene polymerization was prepared and tested according to the general methods and the results are reported in table 2.

TABLE 1

| Example | Propylene Polymerization | | |
|---|---|---|---|
| | Activity Kg/g | XI % | Bulk Density cm³/g |
| 1 | 68.8 | 98.0 | 0.470 |

TABLE 2

| Example | Cocatalyst | Ethylene Polymerization | | |
|---|---|---|---|---|
| | | Activity Kg/g | Melt Index E | Bulk Density cm³/g |
| 2 | Teal | 8.7 | 1.1 | 0.395 |
| 3 | Teal | 9 | 0.63 | 0.387 |
| Comp. 1 | Teal | 7 | 0.53 | 0.351 |

What is claimed is:

1. A catalyst precursor comprising a solid adduct comprising $MgCl_2$, ethanol and water, wherein the amount of ethanol ranges from 52-55% by weight, with respect to the adduct, the amount of water ranges from 0.5-5% by weight, with respect to the adduct, the ethanol/water weight ratio is less than 60 and the porosity of the adduct determined with the Hg method due to pores with radii up to 1 μm and expressed in cm³/g, is lower than 0.1;

wherein the catalytic precursor has a main melting temperature peak of about 97±1° C. and a highest temperature peak of less than 108° C. as determined using differential scanning calorimetry (DSC).

2. A catalyst component comprising the catalyst precursor of claim 1, wherein the catalyst component is obtained by reacting the catalyst precursor with a transition metal compound of one of the groups IV to VI of the Periodic Table of Elements.

3. The catalyst component of claim 2, wherein the component is reacted with an Al-alkyl compound, optionally in the presence of an external electron donor compound.

4. The catalyst component of claim 3, wherein the Al-alkyl compound is triethylaluminum.

5. The catalyst component of claim 3, wherein the external electron donor compound is cyclohexylmethyldimethoxysilane.

* * * * *

UNITED STATES PATENT AND TRADEMARK OFFICE
CERTIFICATE OF CORRECTION

PATENT NO. : 10,377,839 B2
APPLICATION NO. : 14/419446
DATED : August 13, 2019
INVENTOR(S) : Evangelisti et al.

Page 1 of 1

It is certified that error appears in the above-identified patent and that said Letters Patent is hereby corrected as shown below:

In the Specification

In Column 1, Line 4, after "MAGNESIUM DICHLORIDE-ALCOHOL ADDUCTS AND CATALYST COMPONENTS OBTAINED THEREFROM" insert -- This application is the U.S. National Phase of PCT International Application PCT/EP2013/066148, filed August 1, 2013, claiming benefit of priority to European Patent Application No. 12179217.0, filed August 3, 2012, and benefit of priority under 35 U.S.C. § 119(e) of U.S. Provisional Application No. 61/679,446 filed August 3, 2012, the contents of which are incorporated herein by reference in their entirety. --
In Column 1, Line 52, after "water and" delete "and" and insert -- at --
In Column 6, Line 50, delete "cm3" and insert -- $cm^3$ --
In Column 7, Line 6, after "polymerization" insert -- . --
In Column 7, Line 30, after "off" insert -- . --
In Column 7, Line 46, after "Test" insert -- . --
In Column 7, Line 51, delete "cyclohexylmethyldimetoxy" and insert
-- cyclohexylmethyldimethoxy --

Signed and Sealed this
Twenty-eighth Day of June, 2022

Katherine Kelly Vidal
*Director of the United States Patent and Trademark Office*